United States Patent Office 3,775,431
Patented Nov. 27, 1973

3,775,431
PYRROLIDONES FROM γ-BUTYROLACTONES
USING A ZEOLITE CATALYST
Paul G. Rodewald, Jr., Rocky Hill, N.J., assignor to
Mobil Oil Corporation
No Drawing. Filed Dec. 30, 1970, Ser. No. 102,963
Int. Cl. C07d 27/08
U.S. Cl. 260—326.5 FL          7 Claims

ABSTRACT OF THE DISCLOSURE

γ-Substituted-γ-butyrolactams are synthesized as new compositions of matter. These compounds are synthesized by reacting a substituted γ-lactone with ammonia or a primary amine at a temperature from about 200° C. to about 500° C. over certain zeolite catalysts. Additionally, γ-butyrolactone can be reacted with ammonia over zeolite catalysts in the above temperature range to produce γ-butyrolactam.

(1) FIELD OF THE INVENTION

This invention is directed to γ-substituted-γ-butyrolactone and ammonia at elevated temperatures and an improved synthesis of γ-butyrolactam.

(2) DESCRIPTION OF THE ART

γ-Butyrolactam is readily prepared from γ-butyrolactone and ammonia at elevated temperatures and pressures. The reaction temperature ranges from about 200–300° C. and the reaction pressure is about 500 p.s.i.g.

However attempts to synthesize γ-substituted γ-lactams from the corresponding lactones under the same conditions have failed repeatedly. For example, attempts to react γ-n-octyl-γ-butyrolactone with ammonia at 230° C. and at 500 p.s.i.g. have prove ineffective.

(3) SUMMARY OF THE INVENTION

This invention provides a method for synthesizing compounds having the formula:

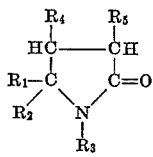

where $R_1$, $R_2$, $R_3$, $R_4$ and $R_5$ are selected from the group consisting of hydrogen, alkyl, alkylhydroxy, aryl, haloalkyl, alkenyl, alkynyl and cycloalkyl.

In a preferred embodiment this invention provides a method for synthesizing γ-butyrolactam from γ-butyrolactone at pressures considerably lower than has been previously possible.

(4) DESCRIPTION OF SPECIFIC EMBODIMENTS

As will be noted from the above formula, the compounds of this invention are γ-lactams with groups hereinbefore defined as $R_1$, $R_2$, $R_3$, $R_4$, $R_5$. Non-limiting examples of the compounds of this invention include:

γ-octyl-γ-butyrolactam
γ-decyl-γ-butyrolactam
γ-phenyl-γ-butyrolactam
γ-phenyl-γ-methyl-γ-butyrolactam
N-butyl-γ-decyl-γ-butyrolactam
N-phenyl-γ-octyl-γ-butyrolactam
N-2-hydroxyethyl-γ-decyl-γ-butyrolactam
N-propyl-γ-methyl-γ-butyrolactam
N-phenyl-γ-methyl-γ-butyrolactam
N-phenyl-γ-decyl-γ-butyrolactam.

The reaction of γ-butyrolactones with ammonia or a primary amine to give the corresponding γ-lactams is carried out in a Pyrex reactor over certain specified zeolites. The zeolite is packed into the middle of the Pyrex reactor and is surrounded on both sides by glass beads. The reactants are introduced into the reactor by means of a carrier gas via a sidearm near the top of the Pyrex reactor. The carrier gas is usually ammonia but can be nitrogen when the reactant is a primary amine.

Several different aluminosilicate catalysts may be employed to promote the reactions contemplated by this invention. Catalysts may be prepared from aluminosilicates that contain a high concentration of hydrogen sites within an ordered internal structure. These hydrogen sites are produced by ionically bonding or chemisorbing hydrogen cations within the molecular structure of the aluminosilicate. Such bonding or chemisorption may be effected by base exchange of the aluminosilicate with a fluid medium containing the hydrogen cations; the resulting exchanged product thus acquiring an acid character.

Other aluminosilicates having a sparse distribution of hydrogen sites may also be employed as catalysts for the present process. The alkali metal and alkaline earth metal (e.g., sodium, lithium, calcium, potassium, and the like) forms of the synthetic and naturally occurring aluminosilicates, including zeolite A and the faujasites such as zeolites X and Y, may serve as catalysts. These zeolites are hereinafter described below in greater detail.

Typical of the aluminosilicates employed in accordance with this invention, are several aluminosilicates, both natural and synthetic, which have a defined pore size of from 5 A. to 15 A. within an ordered internal structure. These aluminosilicates can be described as a three dimensional framework of $SiO_4$ and $AlO_4$ tetrahedra in which the tetrahedra are crosslinked by the sharing of oxygen atoms whereby the ratio of the total aluminum and silicon atoms to oxygen atoms is 1:2. In their hydrated form, the aluminosilicates may be represented by the formula:

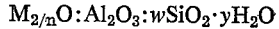
$$M_{2/n}O:Al_2O_3:wSiO_2 \cdot yH_2O$$

wherein M is a cation which balances the electrovalence of the tetrahedra, $n$ represents the valence of the cation, $w$ the moles of $SiO_2$, and $y$ the moles of $H_2O$. The cation can be any one or more of a number of metal ions depending on whether the alumino-silicate is synthesized or occurs naturally. Typical cations include sodium, lithium, potassium, calcium, and the like. Although the proportions of inorganic oxides in the silicates and their spatial arrangement may vary, effecting distinct properties in the aluminosilicates, the two main characteristics of these materials is the presence in their molecular structure of at least 0.5 equivalent of an ion of positive valence per gram atom of aluminum, and an ability to undergo dehydration without substantially effecting the $SiO_4$ and $AlO_4$ framework.

One of the crystalline aluminosilicates utilized by the present invention is the synthetic faujasite designated as zeolite X and described in U.S. 2,882,244. Zeolite X is commercially available in both the sodium and the calcium forms. Other aluminosilicates are contemplated as also being effective catalytic materials for the invention. One of these is zeolite Y and is described in U.S. 3,130,007.

In addition, the synthesized crystalline aluminosilicate designated as zeolite A, has been found to be effective for the purpose of this invention. This zeolite is described in U.S. 2,882,243.

The sodium form of this zeolite may be represented by the following formula:

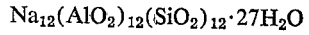
$$Na_{12}(AlO_2)_{12}(SiO_2)_{12} \cdot 27H_2O$$

This material, often designated as a "4A" zeolite, has a pore size of about 4 A. in diameter. When the sodium cations have been substantially replaced with calcium (two sodium cations being removed for one calcium cation) by conventional exchange techniques, the resulting zeolite is designated as a "5A" zeolite and has a defined pore size of about 5 A. in diameter within its ordered internal structure.

Another aluminosilicate material contemplated to be active in the present process is a naturally occurring zeolite known as mordenite. This zeolite has an ordered crystalline structure having a ratio of silicon atoms to aluminum atoms of about 5 to 1. In its natural state it usually appears as a salt which may be represented by the following formula:

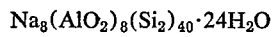

It will be appreciated that other aluminosilicates can be employed as catalysts for the described processes of this invention. A criterion for each catalyst is that its ordered internal structure must have defined pore sizes of sufficient diameters to allow entry of the preselected reactants and the emergence of the desired reaction products. Among the naturally occurring crystalline aluminosilicates which can be employed are faujasite, heulandite, clinoptilolite, chabazite, gmelinite and dachiardite.

One of the preferred aluminosilicate catalysts is prepared from the sodium form of synthetic faujasite, e.g., zeolite X which is commercially available as Linde 13X Molecular Sieve. Another preferred catalyst is the rare earth exchanged zeolite X which has a high concentration of hydrogen sites. This catalyst is also prepared from the sodium form of zeolite X, as the result of a conventional treatment involving partial replacement of the sodium by contact with a fluid medium containing cations of at least one of the rare earth metals. Any medium which will ionize the cations without affecting the crystalline structure of the zeolite may be employed. After such treatment the resulting exchanged product is water washed, dried, and dehydrated. The dehydration thereby produces the characteristic system of open pores, passages or a cavity of crystalline aluminosilicate.

As a result of the above treatment, the rare earth exchanged aluminosilicate is an activated crystalline catalyst material in which the molecular structure has been changed by having metallic rare earth cations and hydrogen cations chemisorbed or ionically bonded thereto. It will be understood that the hydrogen cations found within the aluminosilicate result from the hydrolysis of the rare earth cations in a manner heretofore described. Because specific rare earth metal cations as well as a mixture of several different rare earth metal cations may be base exchanged with the aluminosilicate, the concentration of hydrogen cation sites produced within the catalyst may vary depending on the completeness of the exchange as well as the rare earth cations employed. Thus, it has been found that the rare earth exchanged zeolite X catalyst of this invention may contain from about 0.5 to about 1.0 milliequivalent of hydrogen per gram of solid catalyst. Furthermore, it will be appreciated that the defined pore size of the rare earth exchanged zeolite X may vary from above 6 A., generally from 6 A. to 15 A., and preferably in the approximate range of 10 A. to 15 A. in diameter.

Advantageously, the rare earh cations can be provided from the salt of a single metal or preferable mixture of metals such as a rare earth chloride or didymium chlorides. Such mixtures are usually introduced as a rare earth chloride solution which, as used herein, has reference to a mixture of rare earth chlorides consisting essentially of the chlorides of lanthanum, cerium, praseodymium, and neodymium, with minor amounts of samarium, gadolinium, and yttrium. This solution is commercially available and contains the chlorides of a rare earth mixture having the relative composition cerium (as $CeO_2$) 38% by weight, lanthanum (as $La_2O_3$) 24% by weight, praseodymium (as $Pr_6O_{11}$) 5% by weight, neodymium (as $Nd_2O_3$) 17% by weight, samarium (as $Sm_2O_3$) 3% by weight, gadolinium (as $Gd_2O_3$) 2% by weight, yttrium (as $Y_2O_3$) 0.2% by weight, and other rare oxides 0.8% by weight. Didymium chloride is also a mixture or rare earth chlorides, but having a low cerium content. It consists of the following rare earths determined as oxides: lanthanum, 45–56% by weight; cerium, 1–2% by weight; praseodymium, 9–10% by weight; neodymium, 32–33% by weight; samarium, 5–6% by weight; gadolinium, 3–4% by weight, yttrium, 0.4% by weight; other rare earths 1–2% by weight. It is to be understood that other mixtures of rare earths are equally applicable in the instant invention.

It will be appreciated that zeolite X may also be base exchanged with the rare earth metal cations followed by additional exchange with a fluid medium containing hydrogen cations or a compound convertible to hydrogen cations such as ammonium chloride. The resulting rare earth-hydrogen exchanged zeolite X will also serve as an effective acid catalyst material; one difference being that its concentration of hydrogen sites will be greater than the above-described zeolite X catalyst material.

It will also be apprecited that cations of polyvalent metals other than the rare earths may be employed to replace the exchangeable cations from the aluminosilicates to provide effective catalysts for this process; those having a valence of three or more being preferred for preparation of a high concentration of acid sites. Exemplary of such metals are the lower valence metals silver, cobalt, nickel, zinc, and the higher valence metals vanadium, chromium, manganese, iron, and the like. However, the chemical properties of the metal, i.e., its atomic radius, degree of ionization, hydrolysis constant and the like, will determine its suitability for exchange with a particular aluminosilicate. In addition, metals such as calcium, magnesium, barium, and the like may be used with ammonium chloride or similar ammonium compounds to produce aluminosilicate catalyst for this invention by conventional base exchange techniques; the ammonium cations being decomposed to form hydrogen sites by heating of the exchanged aluminosilicate to drive off ammonia.

Other effective catalysts can be prepared from zeolite Y. Thus, zeolite Y may be further activated by the same base exchange techniques employed for the rare earth exchanged zeolite X catalyst. It has been found that the exchange of rare earth cations for the sodium cations within zeolite Y produces a highly active acid catalyst. However, because of the high acid stability produced by a high silicon to aluminum ratio, the preferred acid form of zeolite Y is prepared by partially replacing the sodium cations with hydrogen cations. This replacement may be accomplished by treatment with a fluid medium containing hydrogen cations, and/or cations capable of conversion to hydrogen cations. Inorganic and organic acids represent the source of hydrogen cations, whereas ammonium compounds are representative of the cations capable of conversion to hydrogen ions. It will be appreciated that the fluid medium may contain a hydrogen cation, an ammonium cation or a mixture thereof, in a pH range from about 1 to about 12. The zeolite A designated as the "5A" zeolite may also serve as a catalyst. Although this material may be further exchanged with other divalent metal cations in a manner similar to that described for the synthetic faujasite, preferably it is used in its calcium form.

The aluminosilicate catalyst may be employed directly as a catalyst or it may be combined with a suitable support or binder. The particular chemical composition of the latter is not critical. It is, however, necessary that the support or binder employed be thermally stable under the conditions at which the conversion reaction is carried out. Thus, it is contemplated that solid porous adsorbents, carriers and supports of the type heretofore employed in catalytic operations may feasibly be used in combination with the crystalline aluminosilicate. Such materials may be catalytically inert or may possess an intrinsic catalytic activity or an activity attributable to close association or reaction with the crystalline aluminosilicate. Such materials include by way of examples, dried inorganic oxide gels and gelatinous precipitates of alumina, silica, zirconia, magnesia, thoria, titania, boria and combinations of these oxides with one another and with other components. Other suitable supports include activated charcoal, mullite, kieselguhr, bauxite, silicon carbide, sintered alumina and various clays. These supported crystalline aluminosilicates may feasibly be prepared as described in U.S. 3,244,643 issued Apr. 5, 1966 to Albert B. Schwartz by growing crystals of the aluminosilicate in the pores of the support. Also, the aluminosilicate may be intimately composited with a suitable binder, such as inorganic oxide hydrogel or clay, for example by ball milling the two materials together over an extended period of time, preferably in the presence of water, under conditions to reduce the particle size of the aluminosilicate to a weight mean particle diameter of less than 40 microns and preferably less than 15 microns. Also, the aluminosilicate may be combined with and distributed throughout a gel matrix by dispersing the aluminosilicate in powdered form in an inorganic oxide hydrosol. In accordance with this procedure, the finely divided aluminosilicate may be dispersed in an already prepared hydrosol or, as is preferable, where the hydrosol is characterized by a short time of gelation, the finely divided aluminosilicate may be added to one or more of the reactants used in forming the hydrosol or may be admixed in the form of a separate stream with streams of the hydrosol-forming reactants in a mixing nozzle or other means where the reactants are brought into intimate contact. The powder-containing inorganic oxide hydrosol sets to a hydrogel after lapse of a suitable period of time and the resulting hydrogel may thereafter, if desired, be exchanged to introduce selected ions into the aluminosilicate and then dried and calcined.

The inorganic oxide gel employed, as described above as a matrix for the metal aluminosilicate, may be a gel of any hydrous inorganic oxide, such as, for example, aluminous or siliceous gels. While alumina gel or silica gel may be utilized as a suitable matrix, it is preferred that the inorganic oxide gel employed be a cogel of silica and an oxide of at least one metal selected from the group consisting of metals of Groups II-A, III-B, and IV-A of the Periodic Table. Such components include for example, silica-alumina, silica-magnesia, silica-zirconia, silica-thoria, silica-berrylia, silica-titania, as well as ternary combinations such as silica-alumina-thoria, silica-lumina-zirconia, silica-alumina-magnesia and silica-magnesia-zirconia. In the foregoing gels, silica is generally present as the major component and the other oxides of metals are present in minor proportion. Thus, the silica content of such gels is generally within the approximate range of 55 to 100 weight percent with the metal oxide content ranging from zero to 45 weight percent. The inorganic oxide hydrogels utilized herein and hydrogels obtained therefrom may be prepared by any method well-known in the art, such as for example, hydrolysis of ethyl orthosilicate, acidification of an alkali metal silicate and a salt of a metal the oxide of which it is desired to cogel with silica, etc. The relative proportions of finely divided crystalline aluminosilicate and inorganic oxide gel matrix may vary widely with the crystalline aluminosilicate content from about 2 to about 90 percent by weight and more usually, particularly where the composite is prepared in the form of beads, in the range of about 5 to about 50 percent by weight of the composite.

The temperature range for the reaction is from about 200° C. to about 500° C. The L.H.S.V. for the lactone is from about .1 to about .5. An excess of ammonia or amine is required for complete conversion to lactam. The reaction may be carried out at a pressure ranging from about atmospheric to about 500 p.s.i.g. The reaction is conveniently carried out at atmospheric pressure. The lactam product is recovered at the bottom of the reactor. The reaction may be depicted as follows:

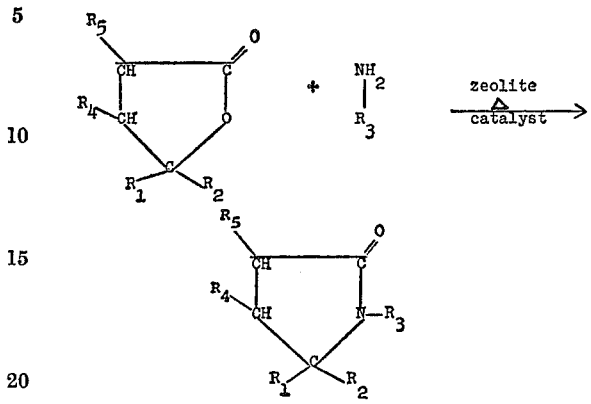

where $R_1$, $R_2$, $R_3$, $R_4$ and $R_5$ have been defined herein.

These γ-lactams can be added to lubricants or fuels which normally exhibit poor antiwear properties. In general, the γ-lactams will impart useful antiwear properties to lubricants or fuels when employed at a concentration within the range of from about 0.1 percent to about 10 percent. Preferably the concentration of the γ-lactam should be from about 0.1 percent to about 5 percent by weight. Among the materials that can be treated with these γ-lactams are mineral and synthetic oils, as well as the greases made therefrom. By synthetic oils are meant synthetic hydrocarbons, polyalkylene oxide oils, polyacetals, polysilicones, as well as synthetic ester oils.

These γ-lactams may also be incorporated into grease compositions. Such greases may comprise a combination of a wide variety of lubricating vehicles selected from those chemicals class mentioned above and thickening or selling agents. Such agents may include any of the well-known metal soaps or salts, which are dispersed in the lubricating vehicle in grease-forming quantities in such amount as to impart to the resulting grease composition the desired consistency. Other thickening agents may be selected from the non-soap thickeners, such as surface modified clays and silicas, aryl ureas, carbon black, calcium complexes and similar materials.

The γ-lactams of this invention are tested for their antiwear properties via the Shell Four-Ball Test and the Pin-On-Disk Wear Test.

In the Four-Ball Test, three steel balls are held in a stationary position in a container to which the lubricant or fuel composition is added. A fourth ball is placed on a chuck, such that the speed and pressure thereof can be regulated. This fourth ball is rotated against the other three, and after the test is completed, the balls are inspected for scars. The size of these scars indicate the amount of wear.

In the Pin-On-Disc Wear Test, a stationary pin having a hemispherical tip is held upright against an axially-mounted rotatable disk 7.6 cm. in diameter. The disk can be rotated at a constant velocity. The pin describes a circle on the surface of the disk concentric with the axis thereof. Both pin and disk are submerged in a vessel holding the test lubricant so that the point of contact between the pin and the rotating disk is lubricated at all imes. The force of the disk against the pin may be changed by varying a load outside of the lubricant vessel. The pin was AISI 1018 steel and the disk was AISI 1020 steel.

The evaluation is the wear rate in units of cc./cm.:volume of metal worn away from the pin per distance traveled by the pin. Both the wear scar diameter and the coefficient of friction are also reported.

The following examples illustrate the preparation of those novel γ-lactams and their use as wear mitigators.

EXAMPLE I

The Pyrex reactor was loaded with 30 cc. of 1/16 inch 13X zeolite pellets and glass beads. Thirty (30) cc. of of γ-octyl-γ-butyrolactone were pumped into the reactor at a rate of 7.5 cc./hour (L.H.S.V.=0.19). The above lactone was reacted with ammonia whose flow rate was 0.3 cubic foot/hour. The reaction temperature was 250° C. Analysis of the product by vapor phase chromatography showed 64 percent γ-lactam, 19 percent open chain amide and 17 percent low boiling material. The conversion was 80 percent. The impurities were removed by trituration with petroleum ether. The γ-lactam product of γ-octyl-γ-butyrolactam was recovered by vapor phase chromatography. I.R. analysis (pressed film) showed NH absorption at 3.03μ and 3.18μ and carbonyl absorption at 6.08μ. The N.M.R. run in acetone-d$_6$ showed the NH proton as a broad peak centered at 3.0τ. Elemental analysis was Calculated (percent): C, 73.04; H, 11.75; N, 7.10. Observed (percent): C, 73.25; H, 11.65; N, 6.94.

EXAMPLE II 40 cc. of γ-decyl-γ-butyrolactone were reacted with ammonia over 50 cc. of 13X zeolite in the same manner as Example I. The product was twice suspended in hexane to give pure γ-decyl-γ-butyrolactam. The I.R. and N.M.R. were compatible with the lactam structure.

EXAMPLE III 20 cc. of γ-phenyl-γ-butyrolactone was reacted with ammonia over 40 cc. of 13X zeolite as in Example I. The γ-lactam product of γ-phenyl-γ-butyrolactam was purified by trituration with petroleum ether. The I.R. (CS$_2$) showed an NH absorption at 3.17μ and a carbonyl absorption at 5.9μ. The N.M.R. showed the phenyl-protons at 2.72τ and the NH proton at 2.92.

EXAMPLE IV 6.0 cc. of γ-phenyl-γ-methyl-γ-butyrolactone was reacted with ammonia over 20 cc. of 13X zeolite as in Example I. The product of γ-phenyl-γ-methyl-γ-butyrolactone was purified by trituration with petroleum ether. The I.R. (CS$_2$) showed an NH absorption at 3.20μ and a carbonyl absorption at 5.92μ. The N.M.R. showed overlapping phenyl-NH protons at 2.72 and an unsplit methyl at 8.32τ.

EXAMPLE V 6.79 grams of γ-decyl-γ-butyrolactone was dissolved in 13.17 grams of n-butylamine. The resultant solution was pumped in to the reactor which was heated to 250° C. The Pyrex reactor was loaded with 13X zeolite pellets. The carrier gas was nitrogen and was pumped into the reactor at 7.5 cc./hour. The resultant product was N-butyl-γ-decyl-γ-butyrolactam. The I.R. showed a lactam carbonyl at 6.08μ.

EXAMPLE VI 38.74 grams of γ-octyl-γ-butyrolactone was dissolved in 118.43 grams of n-hexyl amine and pumped at a rate of 15.0 cc./hour into the reactor containing 13X zeolite as in Example V. The resultant product was N-hexyl-γ-octyl-γ-butyrolactam. The I.R. showed a lactam carbonyl at 6.08μ.

EXAMPLE VII 22.83 grams of γ-decyl-γ-butyrolactone was dissolved in 38.2 grams of ethanolamine. The resultant solution was pumped into the Pyrex reactor at 10.0 cc./hour as in Example V. 40 cc. of 13X zeolite pellets were used. The resultant product was N-2-hydroxyethyl-γ-decyl-γ-butyrolactam. The I.R. showed a hydroxyl at 3.06 and a lactam at 6.09μ.

EXAMPLE VIII 3.00 grams of γ-methyl-γ-butyrolactone was dissolved in 10.64 grams of n-propylamine. The resultant solution was pumped into the Pyrex reactor at 7.5 cc./hour over 13X as in Example V. The resultant product was N-propyl-γ-methyl-γ-butyrolactam. The I.R. showed a lactam carbonyl at 6.08μ. There was no NH absorption. Additionally, 1.2 grams of 4-hydroxy-N-n-propyl valeroamide was isolated as an intermediate product.

EXAMPLE IX 5.01 grams of γ-methyl-γ-butyrolactone was dissolved in 27.94 grams of aniline. The resultant solution was pumped into the Pyrex reactor at 15 cc./hour over 13X as in Example V. The resultant product was N-phenyl-γ-methyl-γ-butyrolactam. The I.R. showed a lactam carbonyl at 5.93μ and no NH absorption.

EXAMPLE X 11.32 grams of γ-decyl-γ-butyrolactone were dissolved in 27.94 grams of aniline. The resultant solution was pumped into the Pyrex reactor at 15 cc./hour over 13X as in Example V. The resultant product was N-phenyl-γ-decyl-γ-butyrolactam. The I.R. showed a lactam carbonyl at 5.93μ and no NH absorption.

EXAMPLE XI 184 cc. of butyrolactone were pumped into the reactor at a rate of 15 cc./hour. The above lactone was reacted with ammonia whose flow rate was 0.3 cubic foot/hour. The reactor temperature was 300° C. The reactor was loaded with 100 cc. of 13X zeolite pellets and glass beads. Analysis of the distilled product showed an 84% yield of butyrolactam. I.R. analysis (pressed film) showed a NH absorption at 3.1μ and a carbonyl absorption at 5.96μ.

EXAMPLE XII

Example XII was conducted in the same manner as Example XI with the exception that no zeolite catalyst was employed. Analysis of the product showed less than 0.5% of γ-butyrolactam.

Examples XI and XII illustrate the utility of 13X zeolite as a catalyst for the reaction of butyrolactone with ammonia.

EXAMPLE XIII 52 cc. of butyrolactone were pumped into the reactor at a rate of 15 cc./hour. The above lactone was reacted with ammonia, whose flow rate was 0.3 cubic foot/hour. The reaction temperature was 300° C. The reactor was loaded with 15 cc. of 13X zeolite pellets. Analysis of the product showed 70% butyrolactam and 30% 4-hydroxy-butyroamide. This example illustrates that a decrease in the amount of butyrolactone and zeolite catalyst, as compared to Example XI will result in the production of less lactam and more open chain amide.

EXAMPLE XIV 100.8 cc. of butyrollactone were pumped into the reactor at 15 cc./hour. The above lactone was reacted with N-methylamine, whose flow rate was 0.3 cubic foot/hour. The reaction temperature was 300° C. The resultant product was N-methyl-γ-butyrolactam. The conversion was 100%. The yield was 88%. The I.R. analysis showed a carbonyl at 598μ. The N.M.R. was run in CDCl$_3$, and showed a methyl peak at 7.08τ.

EXAMPLE XV 9.05 grams of γ-decyl-γ-butyrolactone and 25.23 grams of diethanolamine were pumped simultaneously into the reactor which was heated to 300° C. Benzene was added to the reactants as a solvent. The Pyrex reactor was loaded with 30 cc. of 13X zeolite pellets. The carrier gas was nitrogen and was pumped into the reactor at 0.3 cc./hour. The resulting product was 75% diethanolamide-γ-hydroxy-tetradecanoate.

EXAMPLES XVI–XX

The products of Example I and Example III were tested in duplicate for their anti-wear capabilities in the Four-Ball Machine. The concentration of the lactams was 0.1% in cetane. A 40 kilogram load was used, at 600 r.p.m., 200° F. and for 30 minutes.

Table I indicates that γ-octyl-butyrolactone and γ-phenyl-γ-butyrolactone have good anti-wear properties.

TABLE I

| Lactam | Coefficient of friction | Wear scar diameter | Wear rate, cc./cm. ×10¹¹ |
|---|---|---|---|
| γ-Phenyl-γ-butyrolactam | 0.10 | 0.562 | 3.1 |
| Do | 0.085 | 0.440 | 0.96 |
| γ-Octyl-γ-butyrolactam | 0.10 | 0.660 | 6.4 |
| Do | 0.13 | 0.253 | 0.72 |

EXAMPLE XXI

γ-Phenyl-γ-butyrolactam, the product from Example III was tested for its anti-wear capabilities on the Pin-On-Disk apparatus. A 6 kilogram load was used, at 10 cm./second, sliding velocity, at 200° F. for 180 minutes. The concentration of the lactam in cetane was 0.005%. The coefficient of friction was 0.14 and the wear rate was 8.4 cc./cm.×10¹¹.

EXAMPLE XXII

The product from Example III was tested for its anti-wear capabilities in JP–7 and Jet A fuels. JP–7 has a 60% paraffin, 38% naphthene and a 1 to 2 aromatic content. Jet A fuel has a composition of about 45% paraffins, 40% naphthenes and 15% aromatics.

Friction and wear were tested on the Pin-On-Disk Machine at conditions of 4 kilogram load, 46 cm./sec. sliding velocity, at 125° F. for three hours using a steel specimen.

Table II compares the results for γ-phenyl-γ-butyrolactam and a commercial perfluorinated ester additive. The lactam shows better anti-wear properties than the commercial additive.

TABLE-II

| Additive | JP-7 | | | Jet. A | | |
|---|---|---|---|---|---|---|
| | Coefficient of friction | Wear scar diameter, mm. | Wear rate, cc./cm. ×10¹¹ | Coefficient of friction | Wear scar diameter, mm. | Wear rate cc./cm ×10¹¹ |
| Perfluorinated ester [1] | 0.12 | 1.016 | 3.3 | | | |
| Commercial additive | 0.12 | 1.575 | 19.5 | 0.096 | 1.067 | 4.0 |
| γ-phenyl-γ-butyrolactam | 0.12 | 0.622 | 0.46 | 0.13 | 1.016 | 3.3 |
| | 0.12 | 0.800 | 1.3 | | | |

[1] 200 p.p.m. but only 25% active.

What is claimed is:

1. A method for synthesizing a compound having the formula of

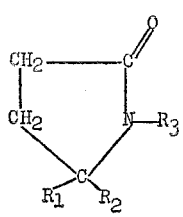

wherein $R_1$ and $R_2$ are each selected from the group consisting of hydrogen, alkyl having up to 10 carbon atoms and phenyl, and $R_3$ is selected from the group consisting of hydrogen, alkyl and hydroxyalkyl having up to 4 carbon atoms and phenyl, which comprises contacting a lactone having the general formula of

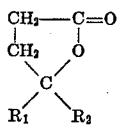

with ammonia or a primary amine having the general formula of

wherein $R_1$, $R_2$ and $R_3$ have the aforesaid identities with a catalyst consisting essentially of a crystalline aluminosilicate zeolite at a temperature of from about 200° C. to about 500° C.

2. The method of claim 1 wherein $R_1$ nd $R_2$ are hydrogen and $R_3$ is selected from the group consisting of hydrogen and methyl.

3. The method of claim 1 wherein $R_1$ is hydrogen, $R_2$ is octyl, and $R_3$ is selected from the group consisting of hydrogen, hexyl and phenyl.

4. The method of claim 1 wherein $R_1$ is hydrogen, $R_2$ is decyl and $R_3$ is selected from the group consisting of hydrogen, butyl, phenyl and 2-hydroxyethyl.

5. The method of claim 1 wherein $R_1$ is selected from the group consisting of hydrogen and methyl, $R_2$ is phenyl and $R_3$ is hydrogen.

6. The method of claim 1 wherein $R_1$ is hydrogen, $R_2$ is methyl and $R_3$ is selected from the group consisting of propyl and phenyl.

7. The method of claim 1 wherein the crystalline aluminosilicate zeolite is zeolite X.

References Cited
UNITED STATES PATENTS

| | | | |
|---|---|---|---|
| 2,674,602 | 4/1954 | Schuster | 260—326.5 |
| 2,775,599 | 12/1956 | Puetzer et al. | 260—326.5 |
| 3,136,780 | 6/1964 | Kolyer et al. | 260—326.5 |
| 3,336,299 | 8/1967 | Fenton | 260—239.3 |
| 3,520,902 | 7/1970 | Anderson | 260—326.3 |
| 3,573,283 | 3/1971 | Merijan et al. | 260—239.3 |

JOSEPH A. NARCAVAGE, Primary Examiner

U.S. Cl. X.R.

252—51.5 R, 455 Z; 260—326.5 N

PO-1050
(5/69)

UNITED STATES PATENT OFFICE
CERTIFICATE OF CORRECTION

Patent No. 3,775,431     Dated November 27, 1973

Inventor(s) PAUL G. RODEWALD, JR.

It is certified that error appears in the above-identified patent and that said Letters Patent are hereby corrected as shown below:

| | |
|---|---|
| Column 1, Line 24 | "lactone and ammonia at elevated temperatures and" should read --lactams, their synthesis and use as wear mitigators and to--. |
| Column 1, Line 26 | After "THE" insert --PRIOR--. |
| Column 1, Line 36 | "prove" should read --proved--. |
| Column 3, Line 16 | "$Na_8(AlO_2)_8(Si_2)_{40} \cdot 24H_2O$" should read --$Na_8(AlO_2)_8(SiO_2)_{40} \cdot 24H_2O$--. |
| Column 3, Line 75 | "38%" should read --48%--. |
| Column 4, Line 24 | "apprecited" should read --appreciated--. |
| Column 5, Line 51 | "lumina-zirconia" should read --alumina-zirconia--. |

Signed and sealed this 17th day of September 1974.

(SEAL)
Attest:

McCOY M. GIBSON JR.
Attesting Officer

C. MARSHALL DANN
Commissioner of Patents